(12) United States Patent
Bromberg et al.

(10) Patent No.: US 11,655,755 B2
(45) Date of Patent: May 23, 2023

(54) STARTUP AND SHUTDOWN OF CLEANUP ENGINE AND OTHER COMPONENTS IN A BIOMASS CONVERSION SYSTEM

(71) Applicant: Massachusetts Institute of Technology, Cambridge, MA (US)

(72) Inventors: Leslie Bromberg, Sharon, MA (US); Emmanouil Kasseris, Cambridge, MA (US); Yu Chen, Allston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/777,750

(22) PCT Filed: Aug. 13, 2020

(86) PCT No.: PCT/US2020/046119
§ 371 (c)(1),
(2) Date: May 18, 2022

(87) PCT Pub. No.: WO2021/101603
PCT Pub. Date: May 27, 2021

(65) Prior Publication Data
US 2022/0412252 A1 Dec. 29, 2022

Related U.S. Application Data

(60) Provisional application No. 62/938,612, filed on Nov. 21, 2019.

(51) Int. Cl.
*F02B 43/08* (2006.01)
*C10J 3/72* (2006.01)
(Continued)

(52) U.S. Cl.
CPC ............... *F02B 43/08* (2013.01); *C10J 3/723* (2013.01); *C10J 3/726* (2013.01); *C10J 3/728* (2013.01);
(Continued)

(58) Field of Classification Search
CPC .......... F02B 43/08; F02B 63/04; F02D 19/04; F02D 41/0002; F02D 41/0025;
(Continued)

(56) References Cited

U.S. PATENT DOCUMENTS 5,688,296 A   11/1997  Andrus, Jr. et al.
6,033,447 A    3/2000  Moock et al.
(Continued)

FOREIGN PATENT DOCUMENTS

WO    2018/119032 A1    6/2018

OTHER PUBLICATIONS

International Search Report and Written Opinion dated Nov. 9, 2020 in corresponding PCT application No. PCT/US2020/046119.

*Primary Examiner* — Hai H Huynh
(74) *Attorney, Agent, or Firm* — Nields, Lemack & Frame, LLC

(57) ABSTRACT

An integrated biomass conversion system and a method of starting and shutting down the system are disclosed. The integrated biomass conversion system comprises a syngas generator, such as a gasifier, a cleanup engine and a syngas utilization system, which could be a power producing engine or a chemical reactor for chemical or fuel synthesis. The cleanup engine operates rich and at high temperatures so that the tars exhausted by the syngas generators are destroyed and not allowed to foul other components. An orderly sequence to start and shut down the integrated biomass conversion system is disclosed.

36 Claims, 8 Drawing Sheets

(51) Int. Cl.
*C10J 3/84* (2006.01)
*F02B 63/04* (2006.01)
*F02D 19/04* (2006.01)
*F02D 41/00* (2006.01)
*F23G 7/08* (2006.01)

(52) U.S. Cl.
CPC ................ *C10J 3/84* (2013.01); *F02B 63/04* (2013.01); *F02D 19/04* (2013.01); *F02D 41/0002* (2013.01); *F02D 41/0025* (2013.01); *F23G 7/08* (2013.01); *C10J 2300/0916* (2013.01); *C10J 2300/0956* (2013.01); *C10J 2300/0976* (2013.01); *C10J 2300/165* (2013.01); *C10J 2300/1671* (2013.01); *C10J 2300/1678* (2013.01); *C10J 2300/1846* (2013.01); *C10J 2300/1876* (2013.01); *F02D 2200/101* (2013.01)

(58) Field of Classification Search
CPC .... F23G 7/08; C10J 3/723; C10J 3/726; C10J 3/728; C10J 3/84; C10J 2300/0916; C10J 2300/0956; C10J 2300/0976; C10J 2300/165; C10J 2300/1671
USPC ................................ 123/1 a, 2, 3, 27 ge, 525
See application file for complete search history.

(56) References Cited

U.S. PATENT DOCUMENTS

| | | |
|---|---|---|
| 8,205,594 B2 | 6/2012 | Fore et al. |
| 8,567,355 B2 | 10/2013 | Wang et al. |
| 2019/0203132 A1 | 7/2019 | Cheiky |

STARTUP AND SHUTDOWN OF CLEANUP ENGINE AND OTHER COMPONENTS IN A BIOMASS CONVERSION SYSTEM

This application claims priority of U.S. Provisional Patent Application Ser. No. 62/938,612, filed Nov. 21, 2019, the disclosure of which is incorporated by reference in its entirety.

FIELD

The present invention is in the technical field of power generation; and more specifically, in the technical field of purification control and power generation resulting from the gasification of solid fuel.

BACKGROUND

There is a clear and unmet need for transformative technologies to improve biomass to power systems by reducing their cost and complexity to make them more competitive with fossil fuels.

According to the Union of Concerned Scientists, biomass resources totaling just under 680 million dry tons could be made available, in a sustainable manner, each year within the United States by 2030. This is enough biomass to produce 732 billion kilowatt-hours of electricity (19 percent of total U.S. power consumption in 2010). These biomass resources are distributed widely across the United States, ensuring that communities across America can benefit both financially and environmentally from increased biomass production. If allowed to biodegrade on its own, this biomass will generate substantial amounts of greenhouse gas (GHG) methane emissions. Approximately 6.5 liters of $CH_4$ are generated per kilogram of decaying biomass.

Globally, biomass represents a huge hope for rural electrification in a sustainable, low cost manner that can trigger economic development based on largely local resources. According to the World Bank, rural electrification can have a profound impact on reducing poverty and improving welfare in the developing world. The developing world already relies on biomass for its energy needs, in particular, for cooking. Furthermore, developing decentralized power generation in the developing world may in many cases make more sense compared to having to invest in a large centralized grid.

Because of the cost of transporting the biomass, biomass is preferably consumed locally, using small gasifiers. The main limitation of small scale gasification systems today is the cost of gas cleanup.

The producer gas created from biomass gasification has high tar content. Tars are large molecule hydrocarbons and are considered contaminants because they cause fouling on hardware surfaces, such as pipes, catalysts and valves. The tar content in the producer gas needs to be reduced to a certain level before further utilization of the syngas, such as for power generation or chemical synthesis. Although there are many existing, mature tar purification technologies, these technologies are usually expensive, which makes the commercial utilization of syngas with high tar content becomes unfeasible.

The idea of using hot, rich combustion in an internal combustion engine as a cleanup system to break down tar into small molecule hydrocarbons was proposed in WO2018119032A1 as a replacement of existing tar purification technologies. The purpose of hot combustion (above the tar dew point) is to break down the tars while they are still in the gaseous phase, before they can condense to cause fouling. The purpose of rich combustion is to release enough heat to break down tars into smaller molecules that do not cause fouling, but not damage the engine due to autoignition. The gases inside the engine are prone to autoignition due to the high intake temperatures. Limiting the stoichiometry to rich allows controlling the amount of autoignition heat release and thus protects the engine.

The successful application of the engine cleanup system may bring down tar purification cost of syngas significantly. The purified syngas then can be directly used in a power producing engine or to manufacture chemicals. Consequently, the commercial utilization of biomass gasification becomes feasible.

The integrated biomass conversion system proposed in WO2018119032A1 has three separate components that must be independently controlled and powered. Therefore, a system and method that allows for orderly startup and shutdown of this integrated biomass conversion system would be beneficial.

SUMMARY

An integrated biomass conversion system and a method of starting and shutting down the system are disclosed. The integrated biomass conversion system comprises a syngas generator, such as a gasifier, a cleanup engine and a syngas utilization system, which could be a power producing engine or a chemical reactor for chemical or fuel synthesis. The cleanup engine operates rich and at high temperatures so that the tars exhausted by the syngas generators are destroyed and not allowed to foul other components. An orderly sequence to start and shut down the integrated biomass conversion system is disclosed.

According to one embodiment, an integrated biomass conversion system for producing power from solid fuels is disclosed. The integrated biomass conversion system comprises a syngas generator to form producer gas from solid fuels; a cleanup engine in communication with an outlet of the syngas generator to remove tar from the producer gas and create cleaned syngas; a power producing engine in communication with an outlet of the cleanup engine to generate power; a generator flare; a syngas flare actuator, in communication with the outlet of the syngas generator and the generator flare; a cleanup flare; a cleanup flare actuator, in communication with the outlet of the cleanup engine and the cleanup flare; a power engine fuel actuator disposed between the outlet from the cleanup engine and an inlet of the power producing engine; a cleanup air filter; a cleanup air actuator in communication with the cleanup air filter and an inlet of the cleanup engine; a power engine air filter; and a power engine air actuator in communication with the power engine air filter and the inlet of the power producing engine. In certain embodiments, the integrated biomass conversion system also comprises a syngas generator temperature sensor, disposed in the syngas generator; a generator flare temperature sensor, disposed in the generator flare; and a cleanup flare temperature sensor, disposed in the cleanup flare. In some embodiments, the system comprises a controller in communication with the syngas generator temperature sensor, the generator flare temperature sensor, the cleanup flare temperature sensor, the syngas flare actuator, the cleanup flare actuator, the cleanup air actuator, the power engine fuel actuator and the power engine air actuator. In certain embodiments, the controller performs a startup of the integrated biomass conversion system by monitoring the syngas generator temperature sensor, the generator flare temperature sensor and the cleanup flare temperature sensor and controlling the syngas flare actuator, the cleanup flare actuator, the cleanup air actuator, the power engine fuel actuator and the power engine air actuator. In certain embodiments, the controller comprises a non-transitory storage element, containing instructions, which when executed, enable the controller to: start up the syngas generator, while the cleanup engine and the power producing engine are turned off; start the cleanup engine after the syngas generator is fully operational; and start the power producing engine after the cleanup engine is fully operational. In certain embodiments, starting the cleanup engine comprises: monitoring a temperature of the syngas generator and a temperature of the producer gas in the generator flare; comparing the monitored temperature to a predetermined value; and when the monitored temperature reaches the predetermined value, closing the syngas flare actuator and opening the cleanup air actuator. In certain embodiments, starting the cleanup engine further comprises opening the cleanup flare actuator and closing the power engine fuel actuator when the monitored temperature reaches the predetermined value. In certain embodiments, starting the power producing engine comprises: monitoring a temperature of the cleaned syngas in the cleanup flare; comparing the monitored temperature to a predetermined value; and when the monitored temperature reaches the predetermined value, closing the cleanup flare actuator and opening the power engine fuel actuator. In certain embodiments, starting the power producing engine further comprises: monitoring a temperature of a coolant in the cleanup engine; comparing the monitored coolant temperature to a predetermined value; and when the monitored coolant temperature reaches the predetermined value, closing the cleanup flare actuator and opening the power engine fuel actuator. In some embodiments, the controller performs a shutdown of the integrated biomass conversion system by monitoring the syngas generator temperature sensor, the generator flare temperature sensor and the cleanup flare temperature sensor and controlling the syngas flare actuator, the cleanup flare actuator, the cleanup air actuator, the power engine fuel actuator and the power engine air actuator. In certain embodiments, the controller comprises a non-transitory storage element, containing instructions, which when executed, enable the controller to: stop the power producing engine and the cleanup engine while the syngas generator is operational; and stop the syngas generator after the power producing engine and the cleanup engine have stopped. In some embodiments, a speed sensor is used to determine that the power producing engine and the cleanup engine have stopped. In certain embodiments, stopping the power producing engine and the cleanup engine comprises: closing the cleanup air actuator and closing the power engine fuel actuator. In some embodiments, stopping the syngas generator comprises: opening the syngas flare actuator; and stopping a flow of solid fuel to the syngas generator. In certain embodiments, a solvent is injected into the cleanup engine after the syngas generator has stopped generating producer gas. In some embodiments, a temperature in the generator flare is monitored using the generator flare temperature sensor to determine when the syngas generator has stopped generating producer gas.

According to another embodiment, a method of starting up the above described integrated biomass conversion system is disclosed. The method comprises starting up the syngas generator, while the cleanup engine and the power producing engine are turned off; starting the cleanup engine after the syngas generator is fully operational; and starting the power producing engine after the cleanup engine is fully operational. In some embodiments, the cleanup engine is warmed prior to being started. In some embodiments, the cleanup engine may be warmed by passing exhaust from the generator flare through the cylinders of the cleanup engine. In certain embodiments, heat from the generator flare is used to heat coolant for the cleanup engine. In certain embodiments, the cleanup engine is operated at lean conditions at startup and heat from the generator flare is used to warm air entering the cleanup engine. In some embodiments, a spark plug is used during warmup and ignition timing is between 50° and 0° before top dead center. In some embodiments, solar energy is used to heat coolant for the cleanup engine. In certain embodiments, starting the cleanup engine comprises: monitoring a temperature of the syngas generator and a temperature of the producer gas in the generator flare; comparing the monitored temperature to a predetermined value; and when the monitored temperature reaches the predetermined value, closing the syngas flare actuator and opening the cleanup air actuator. In certain embodiments, starting the cleanup engine further comprises opening the cleanup flare actuator and closing the power engine fuel actuator when the monitored temperature reaches the predetermined value. In some embodiments, starting the power producing engine comprises: monitoring a temperature of the cleaned syngas in the cleanup flare; comparing the monitored temperature to a predetermined value; and when the monitored temperature reaches the predetermined value, closing the cleanup flare actuator and opening the power engine fuel actuator. In certain embodiments, starting the power producing engine further comprises: monitoring a temperature of a coolant in the cleanup engine; comparing the monitored coolant temperature to a predetermined value; and when the monitored coolant temperature reaches the predetermined value, closing the cleanup flare actuator and opening the power engine fuel actuator.

According to another embodiment, a method of shutting down the above described integrated biomass conversion system is disclosed. The method comprises stopping the power producing engine and the cleanup engine while the syngas generator is operational; and stopping the syngas generator after the power producing engine and the cleanup engine have stopped. In certain embodiments, a rotational speed of the power producing engine and the cleanup engine are monitored to determine that the power producing engine and the cleanup engine have stopped. In certain embodiments, stopping the power producing engine and the cleanup engine comprises: closing the cleanup air actuator and closing the power engine fuel actuator. In certain embodiments, stopping the syngas generator comprises: opening the syngas flare actuator; and stopping a flow of solid fuel to the syngas generator. In certain embodiments, the method further comprises injecting a solvent into the cleanup engine after the syngas generator has stopped generating producer gas. In some embodiments, a temperature in the generator flare is monitored to determine when the syngas generator has stopped generating producer gas.

According to another embodiment, an integrated biomass conversion system for producing chemicals from solid fuels is disclosed. The system comprises a syngas generator to form producer gas from solid fuels; a cleanup engine in communication with an outlet of the syngas generator to remove tar from the producer gas and create cleaned syngas; a chemical reactor in communication with an outlet of the cleanup engine; a generator flare; a syngas flare actuator, in communication with the outlet of the syngas generator and the generator flare; a cleanup flare; a cleanup flare actuator, in communication with the outlet of the cleanup engine and the cleanup flare; a chemical reactor actuator disposed between the outlet from the cleanup engine and an inlet of a chemical system.

According to another embodiment, a method of starting up the above described system is disclosed. The method comprises starting up the syngas generator, while the cleanup engine and the chemical reactor are turned off; starting the cleanup engine after the syngas generator is fully operational; and starting the chemical reactor after the cleanup engine is fully operational. In some embodiments, a flow of cleaned syngas from the cleanup engine is ramped up as the chemical reactor is started.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
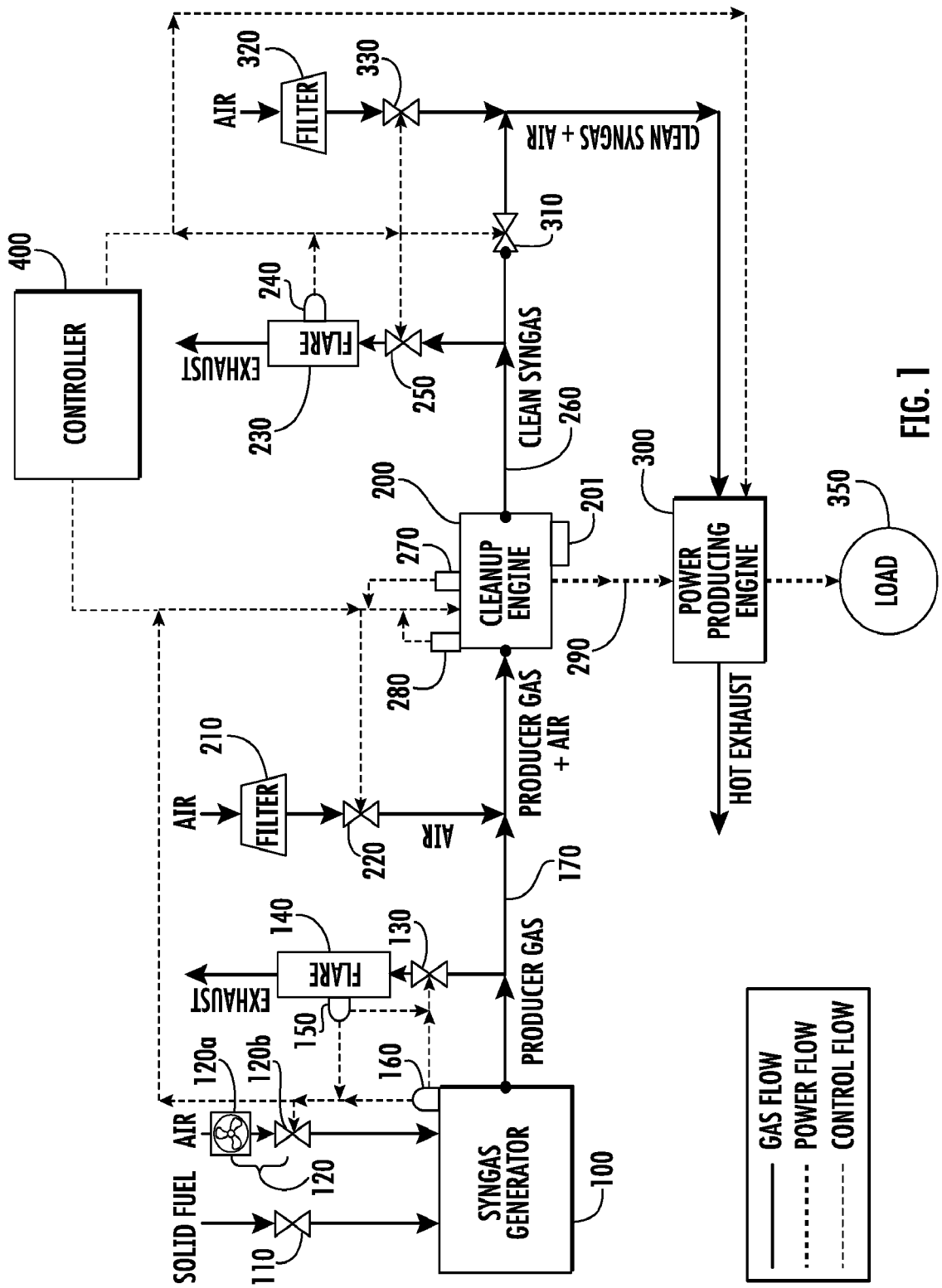
FIG. 1 is a first embodiment of an integrated biomass conversion system.

FIG. 1 shows an integrated biomass conversion system for converting solid fuel to gas, removing heavy organic contaminants ('tars') from the gas and generating power for any use. The integrated biomass conversion system comprises a synthesis gas ("syngas") generator 100, a cleanup engine 200 and a syngas utilization system, which could be a power producing engine 300.

Each of the components will be described in more detail. The goal of the integrated biomass conversion system is to maintain the tar-laden producer gas temperature above the dew point of organic contaminants upstream from the cleanup engine. That dew point is around 350 C. Therefore, if gas upstream from the cleanup engine is never cooled below ~400 C and is combusted, there would be no need for expensive and complicated tar clean up equipment as the tar would simply get burned.

The syngas generator 100 may be a gasifier. Further, the syngas generator 100 may comprise other components, such as a high temperature filter or cyclone, to remove solid contaminants. Additionally, a heat exchanger may be part of the syngas generator 100. The structure of the syngas generator 100 is not limited by this disclosure.

In operation, biomass or other organic material is fed to a syngas generator 100. The syngas generator 100 generates a gas, which is a mixture of $CH_4$, $CO$, $H_2$, $H_2O$, $N_2$ and heavier organic components, referred to as 'tars'. Because the output of the syngas generator 100 contains components which are not typically considered to be syngas, the output of the syngas generator 100 is referred to as producer gas in this disclosure. This producer gas exits the syngas generator 100 at temperatures that can be in excess of 700 degrees centigrade.

The syngas generator 100 has two inputs, the solid fuel, which may be biomass, and an oxidant, such as air, pure oxygen and/or steam. In certain embodiments, a syngas fuel actuator 110 may be disposed prior to the input to the syngas generator 100 to regulate or stop the flow of solid fuel into the syngas generator 100. This syngas fuel actuator 110 may be a conveyor, such as a screw conveyor, a worm conveyor or a hopper. Additionally, a syngas air actuator 120 may be disposed prior to the input to the syngas generator 100 to control the flow of air or another oxidant into the syngas generator 100. In certain embodiments, the syngas air actuator 120 may comprise two components. For example, the syngas air actuator 120 may include a fan or blower 120a and a syngas air valve 120b. Thus, the syngas air actuator 120 may have three different states:

- disabled or closed, where the syngas air valve 120b is closed such that air cannot pass through the syngas air actuator 120;
- enabled or open, where the syngas air valve 120b is open but the fan or blower 120a is disabled; and
- active, where the syngas air valve 120b is open and the fan or blower 120a is actuated.

In other words, when the syngas air actuator 120 is enabled, air is not forced into the syngas generator 100. However, the syngas generator 100 may still be able to draw air into the generator. Thus, enabling the syngas air actuator 120 without activating the fan or blower 120a does not stop the flow of air; it merely stops the flow of forced air. In other words, in induction mode, the engine sucks air through the syngas generator 100 without needing to actuate the fan or blower 120a in the syngas air actuator 120.

In certain embodiments, the air upstream of the syngas generator 100 may be compressed prior to introduction into the syngas generator 100. The air may be compressed using a suitable compressor, such as a turbocharger or a supercharger.

The outlet of the syngas generator 100 is in communication with the inlet to the cleanup engine 200. The outlet of the syngas generator 100 may be a manifold, pipe or other enclosed structure through which the producer gas may flow. It is important to minimize heat loss in the producer gas from the syngas generator 100 to the cleanup engine 200. Thus, the enclosed structure through which the producer gas flows is thermal insulated and its characteristics, such as size and length, are chosen to minimized heat exchange. Additionally, the outlet of the syngas generator 100 is in communication with a syngas flare actuator 130. The syngas flare actuator 130 may be a valve that enables or blocks the flow of producer gas to the generator flare 140. The generator flare 140 is used to burn any producer gas that flows into the generator flare 140. In certain embodiments, the generator flare 140 may comprise an automated spark plug, sensors for emissions and means for emission control. In other embodiments, the generator flare 140 may be a length of pipe with an expansion to hold the flame that is manually lit. The generator flare 140 is used to ensure that syngas, which contains poisonous carbon monoxide and explosive hydrogen gas, is not vented into the atmosphere. The generator flare 140 and the syngas flare actuator 130 may be connected via a manifold, pipe, tube or other suitable structure. The heat from the generator flare 140 can be used for providing process heating, for example, for water heating or for drying.

Even after the system has reached steady state conditions, a fraction of the flow from the producer gas may flow through the generator flare 140 to provide limited process heat. It could also be used to preheat air and/or solid fuel going to the syngas generator 100. Further, the heat from the generator flare 140 may also be used to heat the coolant or oil that circulates through the cleanup engine 200 and/or the power producing engine 300. This may be achieved using a heat exchanger.

A syngas generator temperature sensor 160 may be disposed inside the syngas generator 100 to measure the temperature within the reaction zone or at the outlet of the syngas generator 100 to measure the temperature of the producer gas. A generator flare temperature sensor 150 may be disposed inside the generator flare 140 to measure the temperature of the exhausted producer gas in the generator flare 140. In certain embodiments, the temperature sensors may be thermocouples or other temperature measuring devices.

The outlet of the syngas generator 100 may also be in communication with a cleanup air actuator 220. The cleanup air actuator 220 may be a valve that controls the flow of air or another oxidant into the inlet of the cleanup engine 200. The cleanup air filter 210 and the cleanup air actuator 220 may be connected via a manifold, pipe, tube or other suitable structure.

In other embodiment, the cleanup air actuator 220 is in communication with the cleanup engine 200 through an inlet that is different from that used by the producer gas.

The cleanup engine 200 receives the producer gas from the syngas generator 100 and removes the tar. The cleanup engine 200 may be an internal combustion engine, having one or more cylinders. Each cylinder may have one or more intake valves and one or more outlet valves. The cleanup engine 200 is designed to destroy tar in the producer gas while minimizing the energy consumption so that energy content of clean syngas is high enough to be used in the power producing engine 300. The cleanup engine 200 should therefore operate as rich as possible to maximize left over lower heating value to ensure stable combustion in the power producing engine 300 while ensuring that there was high enough temperature in the cleanup engine 200 to destroy tar. Many ignition strategies can be used to achieve rich combustion in the cleanup engine 200, such as ignition sources such as spark-ignition and microwave-ignition, or compression ignition such as homogeneous charge compression ignition (HCCI), partially premixed compression ignition (PPCI), and reactivity controlled compression ignition (RCCI), or a combination of these strategies.

The operating speed of cleanup engine 200 may be determined by a tradeoff between the gas throughput and the residence time at high temperature (near top dead center), which determines the destruction of the tars. The engine speed can be adjusted to match the production of the gas from the syngas generator 100 and thus the power produced (or the chemical production rate). Faster speeds result in higher temperatures at top dead center, as there is less time for heat transfer between the gas and the intake manifold/engine cylinder wall. In one embodiment, the engine speed of the cleanup engine 200 may be in a range between 600 revolutions per minute (RPM) and 1500 RPM. Also, it is possible that the engine speed is variable.

The compression ratio of cleanup engine 200 may be chosen to provide enough heat to result in sufficient temperatures at the chosen engine speed (that determines the residence time). High compression ratios may be preferred, while minimizing the changes required in the cleanup engine 200. Furthermore, the stability of the combustion of cleanup engine 200 increases with higher compression ratio. Increasing the compression ratio results in earlier autoignition of the air/fuel mixture in the cylinder (when operating with HCCI mode or spark-assist HCCI). Earlier ignition results in higher temperatures at top dead center. Additionally, increased combustion stability allows a richer air/fuel mixture to be achieved and thus a higher energy content of the clean syngas. In one embodiment, the compression ratio can be in a range between 11:1 and 22:1. Changing the engine compression ratio can be achieved by using a filler introduced from the outside to reduce the volume at top dead center (for example, introduced through the spark plug port or through the glow plug port.

A glow plug may be used in some embodiments, especially when the original cleanup engine is a diesel engine, to help achieve early autoignition when operating in HCCI or spark assisted HCCI operation. In addition, either passive or active prechambers may be used to help increase the stability of the combustion, especially when the combustion is very rich. Prechambers have been proposed for very lean operation, but not for rich operation.

Although operation over a wide range of air-to-fuel ratios is possible, for some applications, the highest quality of the gaseous exhaust from the cleanup engine 200 occurs with very rich operation. The preferred operation may be a relative air-to-fuel ratio of between 0.1 to 0.5 or equivalent ratio (inverse of relative air-to-fuel ratio) of between 2 to 10. The relative air-to-fuel ratio can be adjusted depending on operation (gasifier operating conditions, feedstock, ambient temperature).

In the case of fuel synthesis, in addition to minimizing the loss of heating value of the fuel, it is important to reduce the methane concentration and increase the hydrogen to carbon monoxide ratio, as both methanol and Fischer Tropsch processes require a hydrogen to carbon monoxide ratio of about 2. Partial oxidation in the cleanup engine 200 preferentially eliminates hydrogen, but it can also be used to decrease the level of methane generated by the gasifier. The operating conditions of the cleanup engine 200 can be adjusted (inlet temperature, air-to-fuel ratio, engine speed) to both achieve a high degree of syngas cleanup while also conditioning the gas for further downstream processing. One interesting approach is to use a small electrolyzer to provide some additional hydrogen to the reaction, without having to depend upon gas-water shift. In this embodiment, the co-produced oxygen could be used in the cleanup engine 200. In addition or alternatively, the tail gas from the liquid synthesis reactor could be conditioned and reintroduced into the cleanup engine 200 (for example, through hydrogen recycling).

The producer gas is mixed with air that passes through cleanup air filter 210. The air for the cleanup engine may be preheated by the generator flare 140 or other waste heat from the overall system through a heat exchanger. In all embodiments, the mixture fed to the cylinders of the cleanup engine 200 is a rich mixture, where the amount of air is less than the stoichiometric amount, up to and including the possibility of running without any free oxygen.

The mixing of the producer gas and the air could take place outside or inside the cylinder of the cleanup engine 200. In certain embodiments, the producer gas and the air may be introduced through different intake valves in the cylinder. In another embodiment, the producer gas and the air may be injected separately just upstream of their respective intake valves so that, for enhanced safety, there is limited mixing outside of the cylinder. The rich mixture is subsequently compressed inside the cylinders of cleanup engine 200. Even without assistance from an ignition source such as a spark plug, the rich mixture will auto-ignite and partially burn at some point during the compression stroke. Because there is only a limited amount of air available, the auto-ignition in this case is controlled. Only a small amount of the fuel will burn. The pressure and temperature rise, as well as the rise rate, are therefore not destructive for the engine hardware. The in-cylinder temperature and pressure may not be high enough to cause any damage to the engine but may be high enough to destroy the tars. Thus, in certain embodiments, the cylinders of the cleanup engine 200 do not employ an ignition source. Rather, they rely on the rich mixture and high pressure and temperature to cause ignition. In other embodiments, a spark plug can be used.

After the tars have been destroyed by the high temperatures caused by compression and partial combustion in the cleanup engine 200, gas is exhausted by the cleanup engine 200. Optionally, an oxidizer, such as oxygen may also be used to destroy the tars. This outputted gas may be referred to as clean syngas, since it lacks the heavy organic components or tars that were present in the intake to the cleanup engine 200.

A cleanup temperature sensor 280 may be disposed inside the cleanup engine 200 to measure the temperature of coolant fluid in the cleanup engine. Alternatively, the cleanup temperature sensor 280 may measure the temperature of another component within the cleanup engine 200. zone or at the outlet of the syngas generator 100 to measure the temperature of the producer gas. In certain embodiments, the temperature sensor may be thermocouples or other temperature measuring devices.

Additionally, a cleanup speed sensor 270, such as a tachometer, may also be disposed at the drive shaft 290. This cleanup speed sensor 270 may be used to measure the RPM of the drive shaft 290. In the embodiment, the cleanup engine 200 and the power producing engine 300 are coupled, either through coupling or via a shared drive shaft 290. Thus, the cleanup speed sensor 270 may also allow the controller 400 to measure the RPM of the power producing engine 300.

In addition to creating clean syngas, the combustion within the cylinders of the cleanup engine 200 may rotate a drive shaft 290.

In the embodiment shown in FIG. 1, the drive shaft 290 is shared with the power producing engine 300. However, the cleanup engine 200 and the power producing engine 300 may be connected in other ways. For example, the drive shaft of the cleanup engine 200 may be connected to the drive shaft of the power producing engine 300 through gears and/or clutches. The clutch may be used to disconnect the two engines, resulting in the configuration shown in FIG. 3.

The outlet from the cleanup engine 200 may be a manifold, pipe, tube or other suitable structure. The outlet from the cleanup engine 200 is in communication with a cleanup flare actuator 250. The cleanup flare actuator 250 may be a valve that enables or blocks the flow of clean syngas to the cleanup flare 230. The cleanup flare 230 is used to burn any clean syngas that flows into the cleanup flare 230. In certain embodiments, the cleanup flare 230 may comprise an automated spark plug, sensors for emissions and means for emission control. In other embodiments, the cleanup flare 230 may be a length of pipe with an expansion to hold the flame that is manually lit. The cleanup flare 230 is used to ensure that syngas, which contains poisonous carbon monoxide is not vented into the atmosphere. The cleanup flare 230 and the cleanup flare actuator 250 may be connected via a manifold, pipe, tube or other suitable structure. As with the generator flare 140, the cleanup flare 230 heat can be used for process heating. Further, the heat from the cleanup flare 230 may also be used to heat the coolant or oil that circulates through the cleanup engine 200 and/or the power producing engine 300. This may be achieved using a heat exchanger.

It may also be possible to combine generator flare 140 and the cleanup flare 230 into a single flare.

A cleanup flare temperature sensor 240 may be disposed inside the cleanup flare 230 to measure the temperature of the exhausted syngas in the cleanup flare 230. In certain embodiments, the temperature sensor may be a thermocouple or other temperature measuring devices.

The outlet of the cleanup engine 200 is also in communication with a power engine fuel actuator 310. The power engine fuel actuator 310 may be a valve that enables or blocks the flow of clean syngas to the power producing engine 300.

In a first embodiment, the power producing engine 300 receives air via power engine air actuator 330, which may be a valve. The air may pass through a power engine air filter 320, which may be located upstream from the power engine air actuator 330 and in communication with the power engine air actuator via a manifold, pipe or tube. The filtered air is mixed with the clean syngas and enters the inlet of the power producing engine 300. This may occur within a cylinder of the power producing engine 300 or may occur upstream from the cylinders. The power producing engine 300 may be a spark ignited engine or a compression ignited engine in homogeneous charge compression ignition (HCCI) mode. In other embodiments, the power producing engine 300 may be a dual fuel engine where a small amount of diesel fuel is compression ignited, which then serves to ignite the syngas, much like a spark plug that burns the syngas with a flame front.

In certain embodiments, the clean syngas that exits the cleanup engine 200 may be cooled prior to be mixed with air in the power producing engine 300. This may be done using a cooler, a heat exchanger or other suitable device.

In some embodiments, combustion of warm clean syngas and air improves the combustibility of low heating value mixtures.

Additionally, the temperature and conditions in the power producing engine 300 may be adjusted to prevent knock in the power producing engine 300. Spark retard may be used to avoid knock. Or the engine could be designed to minimize knock, for example, by using low compression ratio.

The power producing engine 300 generates power, which may be in the form of mechanical rotation of the drive shaft 290. For example, a load 350 may be in communication with the drive shaft 290. The load 350 may be a generator used to generate electricity or directly to drive pumps.

The controller 400 may include a processing unit, such as a microcontroller, a personal computer, a special purpose controller, or another suitable processing unit. The controller 400 may also include a non-transitory storage element, such as a semiconductor memory, a magnetic memory, or another suitable memory. This non-transitory storage element may contain instructions and other data that allows the controller 400 to perform the functions described herein.

A controller 400 is in communication with syngas generator temperature sensor 160, generator flare temperature sensor 150 and cleanup flare temperature sensor 240 so as to monitor temperatures at various points in the integrated biomass conversion system. The controller 400 is also in communication with syngas fuel actuator 110, syngas air actuator 120, syngas flare actuator 130, cleanup air actuator 220, cleanup flare actuator 250, power engine fuel actuator 310 and power engine air actuator 330 to as to control the flow of air, fuels and gasses through the integrated biomass conversion system.

Finally, the controller 400 is in communication with the cleanup engine 200 and the power producing engine 300. For example, each engine may include a speed sensor, such as a tachometer. The controller 400 may monitor the RPM of each engine. In other embodiments, since the cleanup engine 200 and the power producing engine 300 are coupled, a single speed sensor may be used. For example, as described above, the cleanup engine 200 may have a cleanup speed sensor 270. The controller 400 may use this cleanup speed sensor 270 to indirectly maintain or monitor the frequency of the generator.

As noted above, the integrated biomass conversion system has three components, where the output of each of the first two components (i.e. the syngas generator 100 and the cleanup engine 200) is the input to the next component in the system. Thus, it is important to properly sequence these components to startup or shut down the integrated biomass conversion system.

Figure 2:
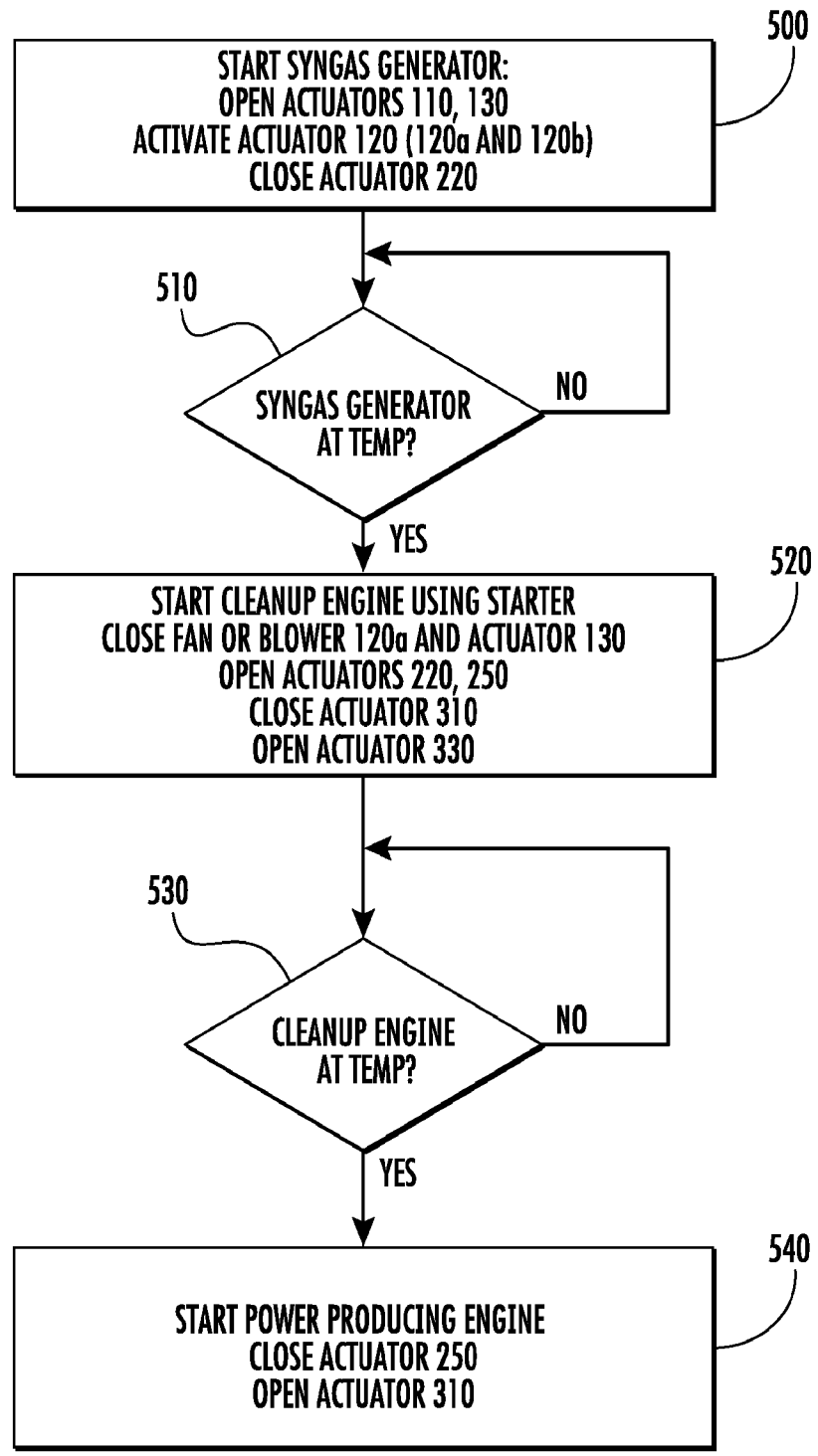
FIG. 2 is a flowchart showing the startup of the integrated biomass conversion system of FIG. 1.

FIG. 2 shows a flowchart illustrating the startup procedure for the integrated biomass conversion system of FIG. 1. The steps in this sequence may be executed by the controller 400.

First, as shown in Box 500, the syngas generator 100 is started. To perform this action, the syngas fuel actuator 110 is opened to allow solid fuel to enter the syngas generator 100. In some embodiments, the syngas generator 100 is started with an external ignition source, such as hot charcoal. Since the syngas generator 100 is not fully operational, air must be forced into the syngas generator 100. Thus, syngas air actuator 120 is activated, which forces air into the syngas generator 100. As described above, the fan or blower 120a is actuated and the syngas air valve 120b is open. Additionally, until the syngas generator 100 is at temperature, it is undesirable to have the producer gas enter the cleanup engine 200, since the tar content will be very high. Therefore, the producer gas is routed through the generator flare 140 by activating the syngas flare actuator 130. Finally, to protect the cleanup air filter 210, the cleanup air actuator 220 is closed. In this state, due to the states of syngas flare actuator 130 and cleanup air actuator 220, all of the producer gas exhausted by the syngas generator 100 is directed through the generator flare 140. As the syngas generator 100 is starting up, the controller 400 may vary the amount of solid fuel and/or air to optimize the operation of the syngas generator 100. This may be done based on the readings from the syngas generator temperature sensor 160. The mechanisms to control the start up of the syngas generator 100 are well known and will not be described here.

As shown in Box 510, the controller 400 may monitor the operation of the syngas generator 100. For example, the controller 400 may monitor the temperature inside the reaction zone or at the outlet of the syngas generator 100 to measure the temperature of the producer gas using syngas generator temperature sensor 160. Additionally, the controller 400 may monitor the temperature of the producer gas that is exhausted by the syngas generator 100. This may be performed using generator flare temperature sensor 150.

When the syngas generator is warmed up, the temperature inside of the syngas generator 100 is relatively constant and stable syngas is formed. Further, when this stable syngas burns in generator flare 140, the combustion temperature is also relatively constant. Therefore, the measurements from syngas generator temperature sensor 160 and generator flare temperature sensor 150 may be compared with values contained in a look up temperature table. This look up table may be disposed in the storage element within the controller 400. When the readings match the tabulated temperature or are within a predetermined tolerance, the initial startup of the syngas generator 100 is complete.

Now that the syngas generator 100 is fully operational, its output may be used as input to the cleanup engine 200. Thus, the cleanup engine 200 must be started, as shown in Box 520.

The combustion chamber of the cleanup engine 200 needs to be warmed up before the producer gas and air can be routed to the cleanup engine 200. Otherwise, even if the producer gas and air are above the tar dew point, condensation may occur locally if the gas is in contact with a cold inner wall of the engine intake system (i.e. intake manifold and valves). One proxy for engine block temperature is the temperature of the coolant. The cleanup engine 200 is considered fully warmed up, when the coolant reaches at least 80° C. Warming up the cleanup engine 200 can be achieved in a number of different ways.

Figure 7:
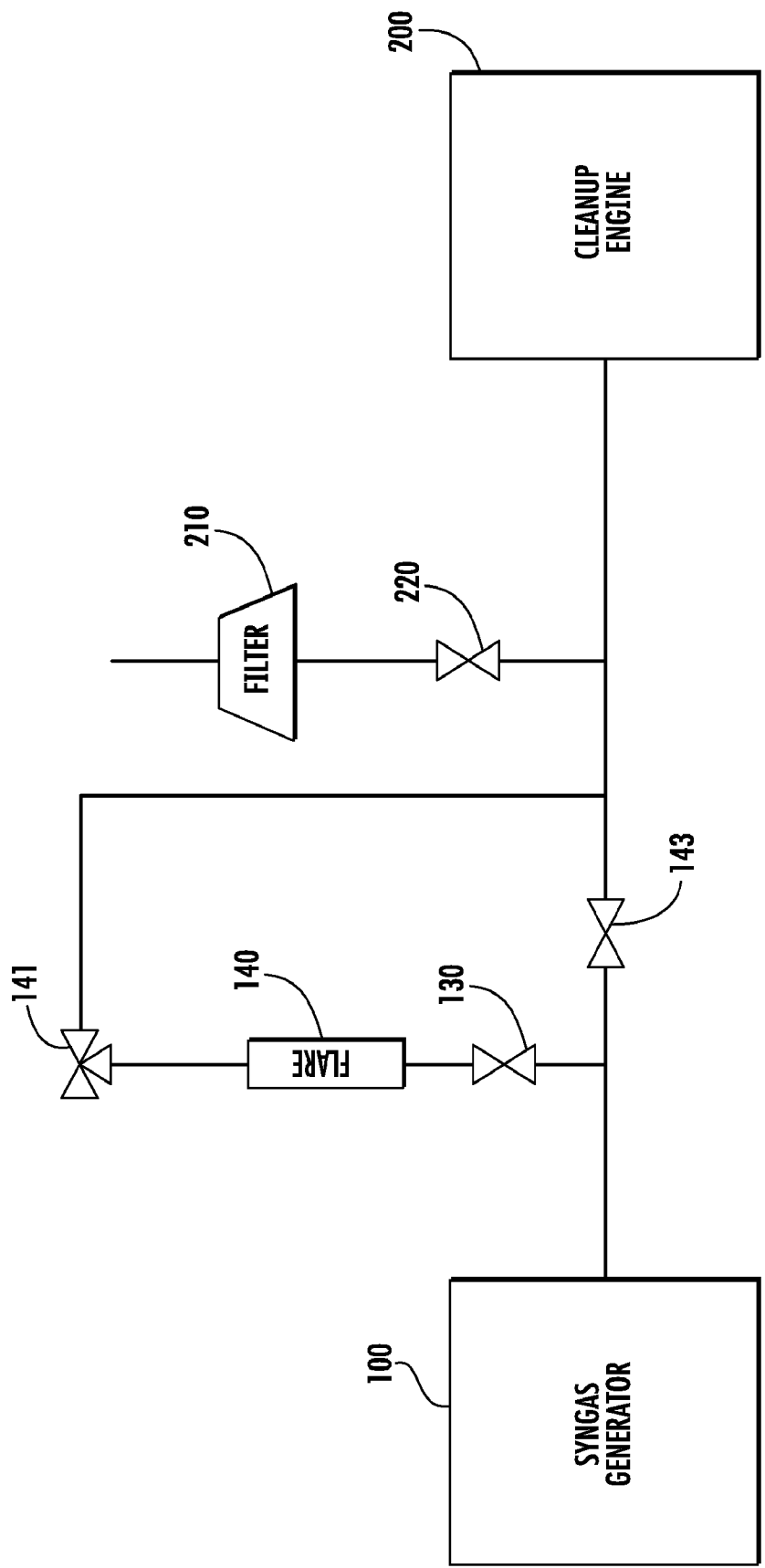
FIG. 7 shows a configuration of the generator flare and intake for the cleanup engine according to one embodiment.

In one embodiment, shown in FIG. 7, exhaust from the generator flare 140 is pulled through the cleanup engine 200. A valve 141 may be used to select whether the exhaust from the generator flare 140 is emitted to atmosphere or routed toward the intake of the cleanup engine 200. A cleanup starter or an electric motor may be required to crank the cleanup engine 200 to draw the exhaust gas. Alternatively, the cleanup engine 200 may be "parked" at an angle where one of the cylinders is at a point where both the inlet and exhaust valves are open (due to valve-overlap). The cleanup engine 200 could be rotated to warm up a second cylinder, and so on, until the cleanup engine 200 is sufficiently warmed up. A valve 143 may be used to prevent the flow of producer gas from the syngas generator 100 to the cleanup engine 200 during the warm up process.

In a second embodiment, a heat exchanger may be used to warm up the engine coolant from the heat that is generated from syngas generator 100 operation and the generator flare 140, with the coolant flowing through the cleanup engine 200.

In a third embodiment an electric block heater (i.e. cartridge heater) is disposed near the cleanup engine 200 to warm up the engine. The heater can be powered by either a battery or grid.

Figure 8:
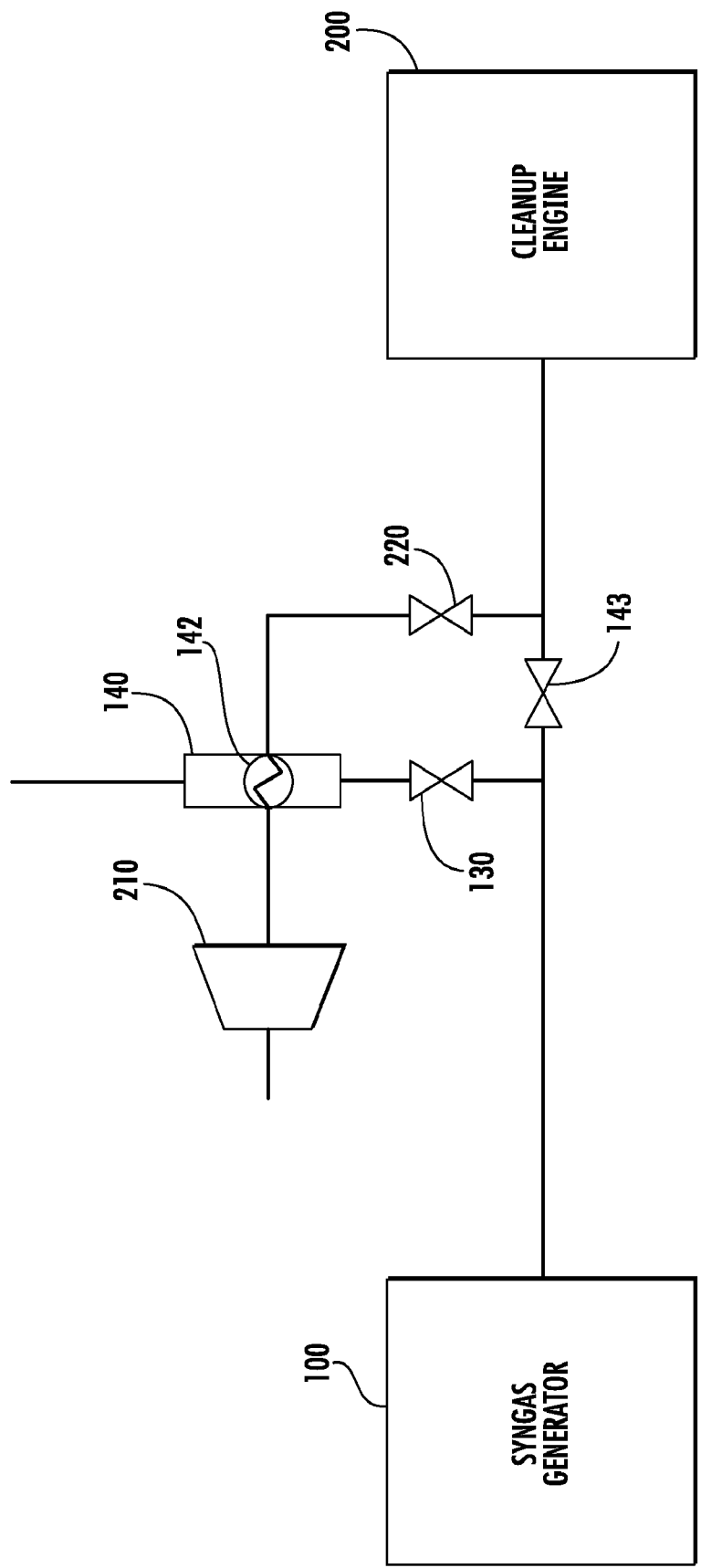
FIG. 8 shows a configuration of the generator flare and intake for the cleanup engine according to a second embodiment.

In a fourth embodiment, the cleanup engine 200 is operated at leaner condition and the engine is warmed with the heat generated during combustion. Leaner conditions require less producer gas and therefore, less tar will be deposited on the cold engine wall during warm up process. However, the lean operation may require air to be preheated for combustion to occur. In this case, as shown in FIG. 8, the air intake line can be arranged such that it passes around the generator flare 140 so that the air intake line can be heated up by the flame and/or the hot exhaust gas of generator flare 140 via conduction. A heat exchanger 142 may also be used to heat the intake air using the gasses from the generator flare 140. Alternatively, the generator flare 140 may be operated with excess air, such that the combustion products include free oxygen that can be used for combustion in the cleanup engine 200. Additionally, in the case that lean burn cannot be achieved with compression ignition, spark plug may be used to provide ignition source. The spark timing should be advanced in to ensure the ignition. The spark timing should be in a range between 50° and 0° before top dead center. A valve 143 may be used to prevent the flow of producer gas from the syngas generator 100 to the cleanup engine 200 during the warm up process.

In a fifth embodiment, the cleanup engine 200 is operated with a clean fuel, such as either diesel, gasoline or an alcohol during the warm up process of the engine. In certain embodiments, a combination of the first through fourth embodiments may be used to provide a synergistic effect. For example, a cartridge heater may be installed and used at the intake manifold and the engine head of the cleanup engine 200 to locally warm up the intake manifold and intake valves while the engine is firing at lean condition to minimize the tar deposit.

In a sixth embodiment, solar energy is used to warm up the engine coolant. The solar energy can be obtained from a solar panel that is composed of either evacuated tube or a flat plate. In this embodiment, a pump may be used to circulate the engine coolant from/to the solar panel. The pump can be powered by either a battery or the electrical grid.

To begin movement of the cylinders in the cleanup engine 200, a cleanup starter 201 may be employed. This cleanup starter 201 may be similar to that used for any conventional combustion engine. The electricity needed to activate the cleanup starter 201 may be provided by a power grid or by a battery.

Additionally, the syngas flare actuator 130 is closed to stop the flow of producer gas through the generator flare 140. Further, since the syngas generator 100 is fully operational, it may be acceptable to disable the fan or blower 120a as air no longer needs to be forced into the syngas generator 100 because the cleanup engine 200 is providing suction.

The cleanup air actuator 220 is opened to allow air to pass through the cleanup air filter 210 and enter the cleanup engine 200.

Like the syngas generator 100, at startup, the output of the cleanup engine 200 may not be suitable for the next component. Therefore, cleanup flare actuator 250 is opened and power engine fuel actuator 310 is closed. This forces all of the exhaust from the cleanup engine 200 to exit through the cleanup flare 230.

Further, since the power producing engine 300 shares a drive shaft 290 with the cleanup engine 200, or is coupled with the drive shaft of the cleanup engine 200, its cylinders are moving once the cleanup engine 200 begins operating. Power engine air actuator 330 may be opened to allow clean air to pass through the cylinders of the power producing engine 300.

At this time, the controller 400 waits for the cleanup engine 200 to reach operational temperatures, as shown in Box 530. When the cleanup engine 200 is warmed up, the combustion temperature measured by cleanup flare temperature sensor 240 is relatively constant. Additionally, the temperature of the cleanup engine 200, as measured by cleanup temperature sensor 280, may be within a predetermined range. Therefore, to monitor and control the startup of the cleanup engine 200, signals from the cleanup flare temperature sensor 240 and/or the cleanup temperature sensor 280 can be compared with values in a look up temperature table. When the signals from the sensors match the tabulated temperature or are within a predetermined tolerance, the startup of the cleanup engine 200 is complete.

Once the cleanup engine 200 reaches operational temperature, the power producing engine 300 may be started, as shown in Box 540. Since it shares a drive shaft 290 with, or is coupled with, the cleanup engine 200, there is no need for a starter. Rather, to begin operation, the cleanup flare actuator 250 is closed and the power engine fuel actuator 310 is opened. This allows the flow of clean syngas and air to the power producing engine 300. In certain embodiments, the power producing engine 300 is a spark ignition engine and the controller 400 controls the timing of the spark. In other embodiments, the power producing engine 300 is a dual fuel engine and the controller 400 controls the flow of the second fuel into the power producing engine 300.

The power producing engine 300 is now fully operational and drives the load 350, wherein may generate electricity, in some embodiments.

Figure 3:
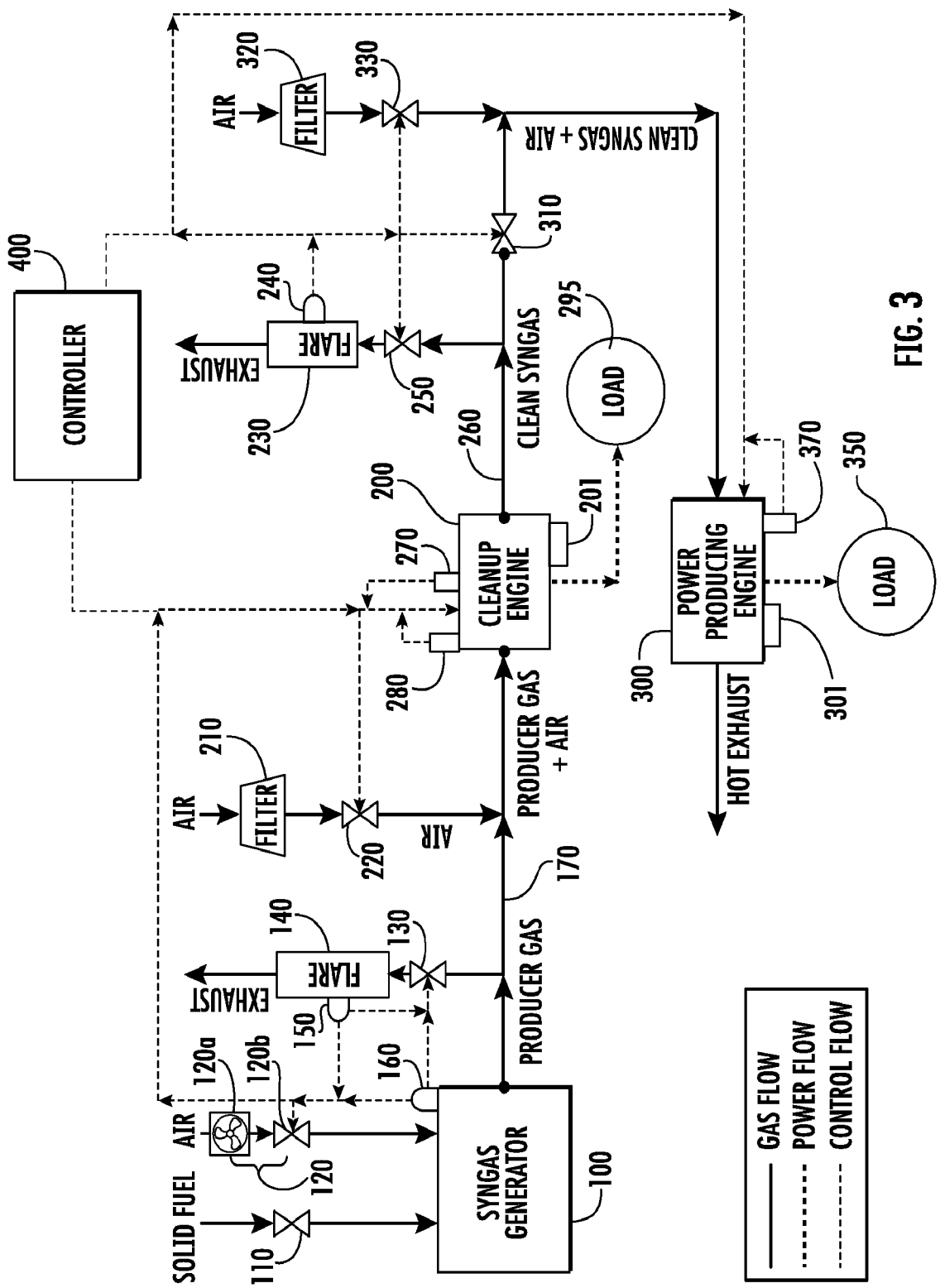
FIG. 3 is a second embodiment of an integrated biomass conversion system.

FIG. 3 shows another embodiment of the integrated biomass conversion system. Most components are repeated from FIG. 1 and like components have been given identical reference designators.

In this embodiment, the cleanup engine 200 and the power producing engine 300 do not share a drive shaft. Therefore, the power producing engine 300 includes a power engine starter 301. Further, a second load 295 may be disposed on the drive shaft of the cleanup engine 200. For example, the second load 295 may be a generator. Further, since the engines are no longer coupled, there may be a power speed sensor 370 disposed on or near the drive shaft of the power producing engine 300. This allows the controller 400 to monitor the RPM of the power producing engine 300 and indirectly the frequency of the load 350.

Figure 4:
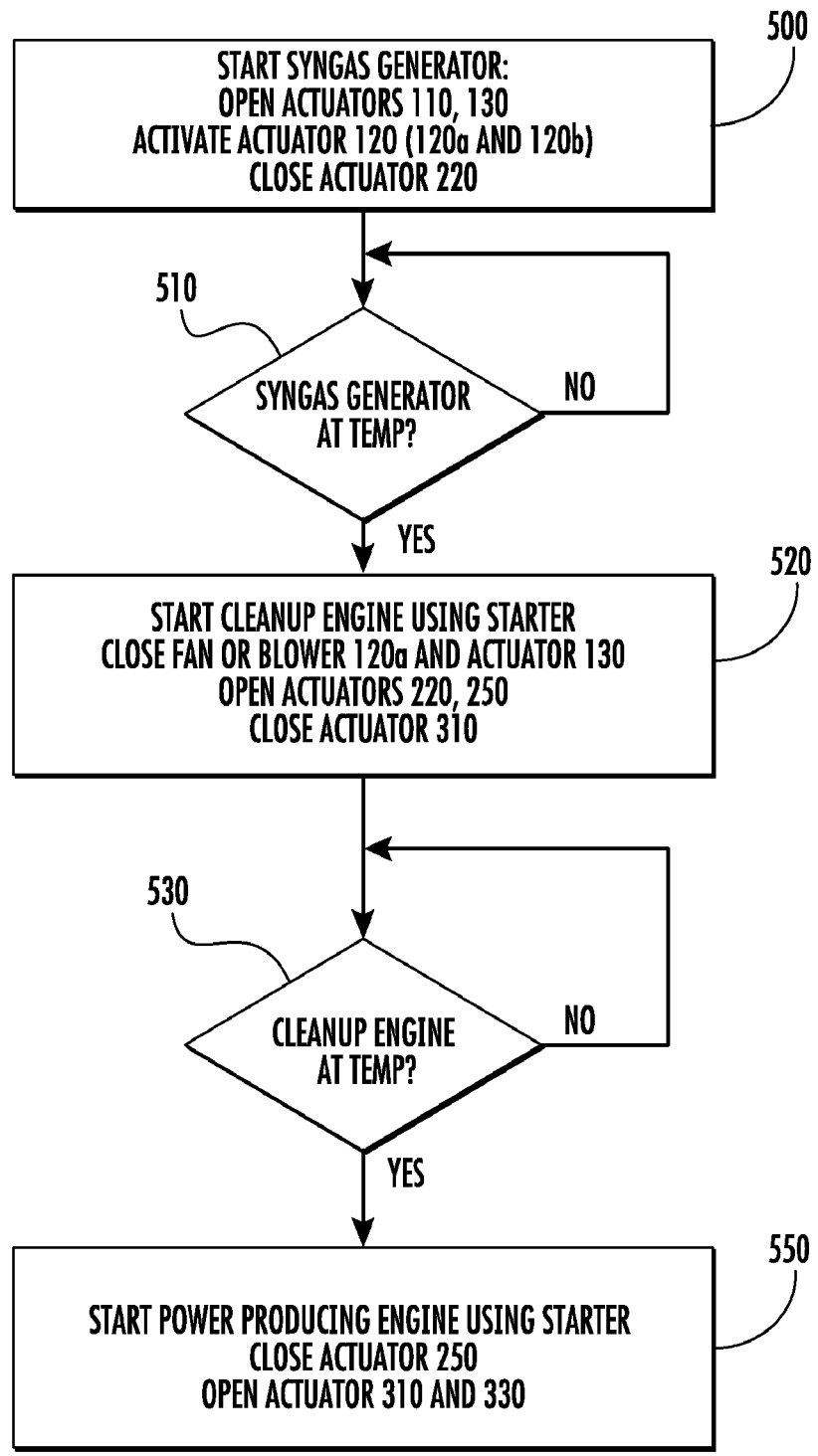
FIG. 4 is a flowchart showing the startup of the integrated biomass conversion system of FIG. 3.

FIG. 4 shows the startup process for the integrated biomass conversion system of FIG. 3. Note that the first four steps in the sequence are nearly the same as described in FIG. 2, except that the timing of the power engine air actuator 330 may be changed. In this embodiment, when the cleanup engine 200 reaches operational temperature, the power producing engine 300 must be started, as shown in Box 550. In this embodiment, the controller 400 activates power engine starter 301, and closes cleanup flare actuator 250. The controller 400 also opens power engine fuel actuator 310 and power engine air actuator 330 to allow air and cleaned syngas to enter the power producing engine 300.

Once Box 540 or 550 is completed, the integrated biomass conversion system described herein is completely operational and is producing power from solid fuels, such as biomass.

Figure 5:
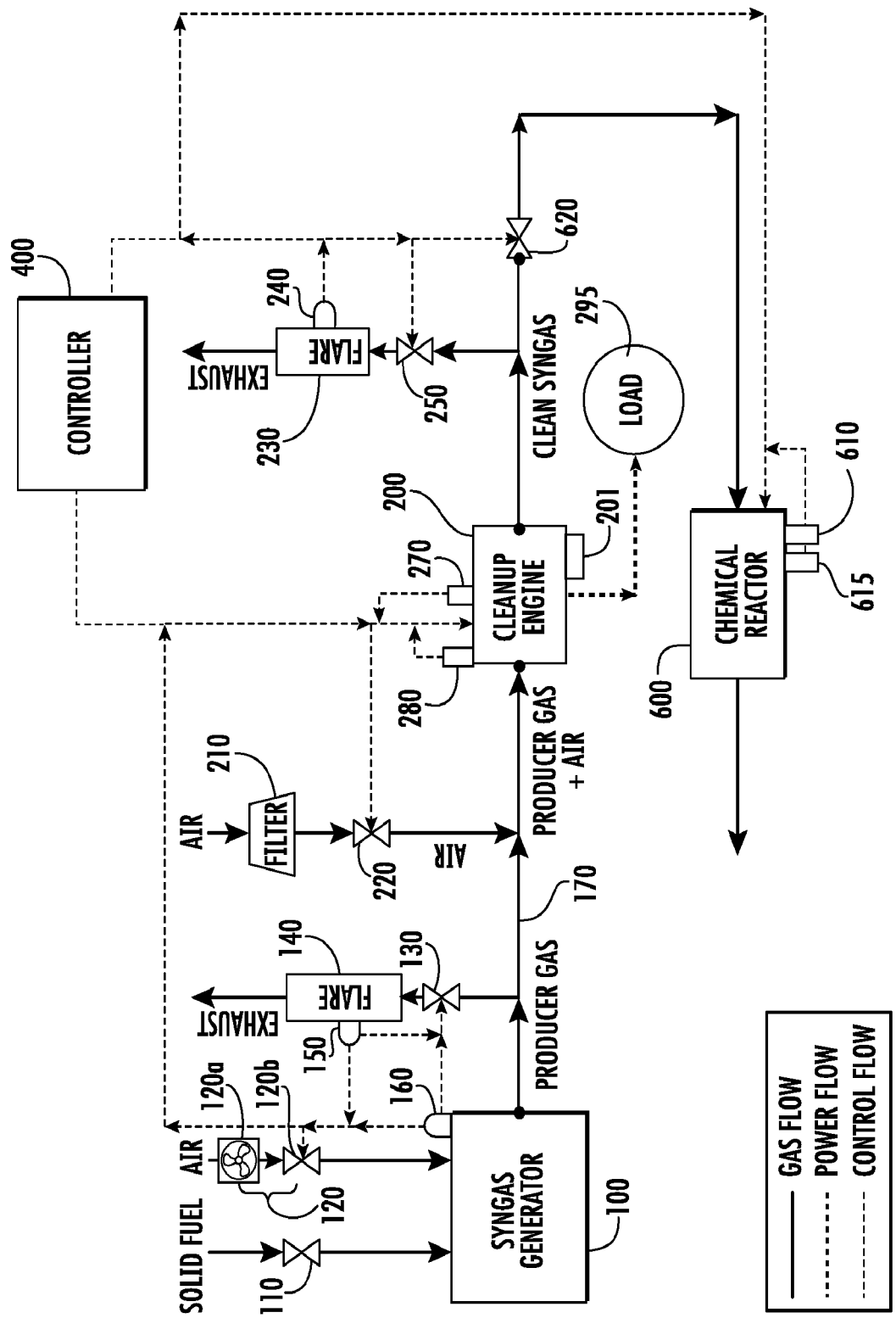
FIG. 5 is a third embodiment of an integrated biomass conversion system.

FIG. 5 shows another embodiment of the integrated biomass conversion system. Most components are repeated from FIG. 1 and like components have been given identical reference designators. In this embodiment, the power producing engine 300 has been replaced with a chemical reactor 600. As the chemical reactor 600 only utilizes the syngas, the power engine air actuator and power engine air filter have been eliminated. Additionally, the chemical reactor 600 may include a temperature sensor 610 and a pressure sensor 615 that is monitored by the controller 400. The reaction that takes place in chemical reactor 600 is dependent on temperature and pressure. The temperature sensor 610 and pressure sensor 615 can be used by the controller 400 to monitor/control the chemical reactivity, and thus the production of chemicals/fuels. Additionally, the power engine fuel actuator 310 has been replaced with a chemical reactor fuel actuator 620. The chemical reactor fuel actuator 620 is disposed in the same location as the power engine fuel actuator 310 of the previous embodiments and is controlled in the same manner.

The chemical reactor 600 may be used to synthesize chemicals or fuels. For example, the syngas can be used to make methanol, diesel-like fuels (Fischer-Tropsch), gasoline, DME or ammonia. In this embodiment, it is desired to have relatively constant throughput of syngas. It may also be beneficial if the cleanup engine 200 provides pressurization of the syngas, through manipulation of valve timing or just throttling of the exhaust and systems downstream from the cleanup engine. It may be possible to have a pressure of 2-4 bars in the exhaust from the cleanup engine 200, to minimize the requirements from a compressor if the chemical reactor 600 requires high pressure. The chemical reactor 600 would include syngas conditioning systems to match the requirements for the synthesis reactor, such as composition, pressure and temperature.

As described above, the controller 400 is in communication with the cleanup engine 200 and the chemical reactor 600. For example, the cleanup engine may include a speed sensor, such as a tachometer. The controller 400 may monitor the RPM of the cleanup engine. In certain embodiment, the controller 400 may be in communication with sensors disposed in the exhaust manifold of the cleanup engine 200 to measured parameters such as the composition and conditions of the clean syngas. These sensors may include a nondispersive infrared (NDIR) sensor that can be used to detect carbon monoxide, carbon dioxide and methane. Additionally, a thermal conductivity sensor may also be used to detect hydrogen. These conditions may include flow rate, temperature and pressure. By monitoring these attributes, the controller 400 may be able to control the rate of production of the products in the chemical reactor 600.

The startup sequence shown in FIG. 4 is applicable to an integrated biomass conversion system utilizing the chemical reactor 600. One difference is that power engine air actuator 330 is no longer present. Another difference is that the chemical reactor 600 needs to ramped up slowly to control the reactions, and avoid a run-away or other events that can damage the catalyst or the reactor. Thus, the cleanup engine 200 may be controlled so that the flow rate of syngas exhausted by the cleanup engine 200 slowly increases. For example, the controller 400 may control the chemical reactor fuel actuator 620 to adjust the flow of clean syngas to the chemical reactor 600. The controller 400 may also partially open cleanup flare actuator 250 so that excess syngas may be burned in the cleanup flare 230.

Figure 6:
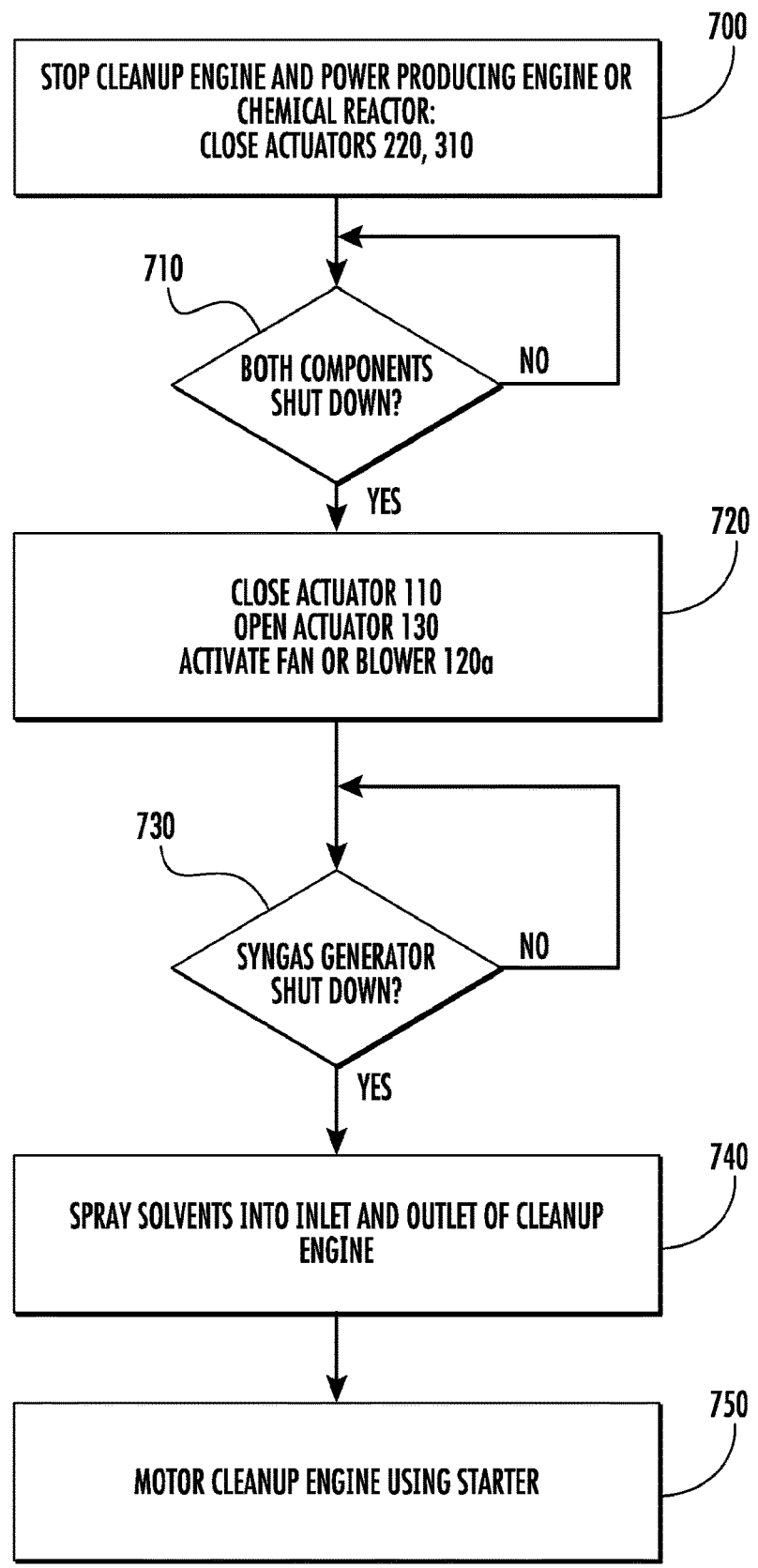
FIG. 6 is a flowchart showing the shutdown of the integrated biomass conversion system of FIG. 1.

At a later time, it may be desirable to shut down the integrated biomass conversion system. FIG. 6 shows a flowchart that describes the sequence of operations performed by the controller 400 to shut down the system.

First, as shown in Box 700, the controller 400 stops the cleanup engine 200 and the power producing engine 300 or chemical reactor 600. This may be achieved by disabling the flow of air into the cleanup engine 200 and the flow of fuel into the power producing engine 300 or chemical reactor 600. Thus, the controller 400 closes the cleanup air actuator 220 and the power engine fuel actuator 310. Eventually, due to the lack of oxygen or fuel, both components will shut down, as shown in Box 710. In certain embodiments, as described above speed sensors, such as cleanup speed sensor 270 and power speed sensor 370 may be disposed on one or both engines. The controller 400 may use the reading from these speed sensors to determine when the engines are shut down. Alternatively, if the load 350 is a generator, a frequency detector may be used to determine when the generator has stopped producing electricity.

Once the cleanup engine 200 and the power producing engine 300 or chemical reactor 600 are stopped, the controller shuts down the syngas generator 100. As shown in Box 720, the controller closes syngas fuel actuator 110 to stop the flow of solid fuel to the syngas generator 100. The controller may also enable the fan or blower 120a to push air into the syngas generator 100. Additionally, the controller 400 opens the syngas flare actuator 130 so that all of the exhaust from the syngas generator 100 exits through the generator flare 140.

Eventually, in the absence of fuel, the gasification process inside of syngas generator 100 will change to combustion. No more flammable producer gas is produced, instead, much hotter flue gas is produced. This change in status can be determined by comparing the syngas generator temperature sensor 160 and generator flare temperature sensor 150 with a lookup table, as shown in Box 730. In other words, when the hotter flue gas is detected, it is determined that the syngas generator 100 is shut down.

Optionally, when or after the hotter flue gas is detected, a solvent may be introduced into the cleanup engine at its inlet and/or its outlet, as shown in Box 740. A solvent that dissolves tar may be sprayed into the intake and outlet valve stems of the cleanup engine 200. The solvent may be methanol or acetone. These solvents will remove any tar residues on the valve stems that may present the valves from opening during the next startup.

The solvents may be sprayed by inserting nozzles to face the valve stems and are powered by an electrical pump. As shown in Box 750, during the solvent injection, the cleanup engine 200 may need to be motored using the cleanup starter 201 so the removed tar and solvent, which are likely in the vapor form as the cleanup engine 200 is still hot and the solvent is volatile, can be scavenged from the cleanup engine 200. In certain embodiments, the cleanup engine 200 is modified to allow the inclusion of these nozzles.

At this point, the integrated biomass conversion system is completely shut down. This process describes an orderly shut down of the integrated biomass conversion system. However, in certain embodiments, it may be necessary to perform an emergency shutdown.

In the case of an emergency shutdown, the cleanup air actuator 220 and the power engine fuel actuator 310 will be shut off. The cleanup flare actuator 250 will also be opened. By doing this, no air is drawn into the cleanup engine 200 and no syngas is drawn into the power producing engine 300 or the chemical reactor 600. Both components will stop immediately.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An integrated biomass conversion system for producing power from solid fuels, comprising:
    a syngas generator to form producer gas from solid fuels;
    a cleanup engine in communication with an outlet of the syngas generator to remove tar from the producer gas and create cleaned syngas;
    a power producing engine in communication with an outlet of the cleanup engine to generate power;
    a generator flare;
    a syngas flare actuator, in communication with the outlet of the syngas generator and the generator flare;

a cleanup flare;
a cleanup flare actuator, in communication with the outlet of the cleanup engine and the cleanup flare;
a power engine fuel actuator disposed between the outlet from the cleanup engine and an inlet of the power producing engine;
a cleanup air filter;
a cleanup air actuator in communication with the cleanup air filter and an inlet of the cleanup engine;
a power engine air filter; and
a power engine air actuator in communication with the power engine air filter and the inlet of the power producing engine.

2. The integrated biomass conversion system of claim 1, further comprising:
a syngas generator temperature sensor, disposed in the syngas generator;
a generator flare temperature sensor, disposed in the generator flare; and
a cleanup flare temperature sensor, disposed in the cleanup flare.

3. The integrated biomass conversion system of claim 2, further comprising a controller in communication with the syngas generator temperature sensor, the generator flare temperature sensor, the cleanup flare temperature sensor, the syngas flare actuator, the cleanup flare actuator, the cleanup air actuator, the power engine fuel actuator and the power engine air actuator.

4. The integrated biomass conversion system of claim 3, wherein the controller performs a startup of the integrated biomass conversion system by monitoring the syngas generator temperature sensor, the generator flare temperature sensor and the cleanup flare temperature sensor and controlling the syngas flare actuator, the cleanup flare actuator, the cleanup air actuator, the power engine fuel actuator and the power engine air actuator.

5. The integrated biomass conversion system of claim 4, wherein the controller comprises a non-transitory storage element, containing instructions, which when executed, enable the controller to:
start up the syngas generator, while the cleanup engine and the power producing engine are turned off;
start the cleanup engine after the syngas generator is fully operational; and
start the power producing engine after the cleanup engine is fully operational.

6. The integrated biomass conversion system of claim 5, wherein starting the cleanup engine comprises:
monitoring a temperature of the syngas generator and a temperature of the producer gas in the generator flare;
comparing the monitored temperature to a predetermined value;
and when the monitored temperature reaches the predetermined value, closing the syngas flare actuator and opening the cleanup air actuator.

7. The integrated biomass conversion system of claim 6, wherein starting the cleanup engine further comprises opening the cleanup flare actuator and closing the power engine fuel actuator when the monitored temperature reaches the predetermined value.

8. The integrated biomass conversion system of claim 5, wherein starting the power producing engine comprises:
monitoring a temperature of the cleaned syngas in the cleanup flare;
comparing the monitored temperature to a predetermined value;
and when the monitored temperature reaches the predetermined value, closing the cleanup flare actuator and opening the power engine fuel actuator.

9. The integrated biomass conversion system of claim 8, wherein starting the power producing engine further comprises:
monitoring a temperature of a coolant in the cleanup engine;
comparing the monitored coolant temperature to a predetermined value; and
when the monitored coolant temperature reaches the predetermined value, closing the cleanup flare actuator and opening the power engine fuel actuator.

10. The integrated biomass conversion system of claim 3, wherein the controller performs a shutdown of the integrated biomass conversion system by monitoring the syngas generator temperature sensor, the generator flare temperature sensor and the cleanup flare temperature sensor and controlling the syngas flare actuator, the cleanup flare actuator, the cleanup air actuator, the power engine fuel actuator and the power engine air actuator.

11. The integrated biomass conversion system of claim 10, wherein the controller comprises a non-transitory storage element, containing instructions, which when executed, enable the controller to:
stop the power producing engine and the cleanup engine while the syngas generator is operational; and
stop the syngas generator after the power producing engine and the cleanup engine have stopped.

12. The integrated biomass conversion system of claim 11, wherein a speed sensor is used to determine that the power producing engine and the cleanup engine have stopped.

13. The integrated biomass conversion system of claim 11, wherein stopping the power producing engine and the cleanup engine comprises:
closing the cleanup air actuator and closing the power engine fuel actuator.

14. The integrated biomass conversion system of claim 11, wherein stopping the syngas generator comprises:
opening the syngas flare actuator; and
stopping a flow of solid fuel to the syngas generator.

15. The integrated biomass conversion system of claim 11, further comprising:
injecting a solvent into the cleanup engine after the syngas generator has stopped generating producer gas.

16. The integrated biomass conversion system of claim 15, wherein a temperature in the generator flare is monitored using the generator flare temperature sensor to determine when the syngas generator has stopped generating producer gas.

17. A method of starting up the integrated biomass conversion system of claim 1, comprising:
starting up the syngas generator, while the cleanup engine and the power producing engine are turned off;
starting the cleanup engine after the syngas generator is fully operational; and
starting the power producing engine after the cleanup engine is fully operational.

18. The method of claim 17, wherein the cleanup engine is warmed prior to being started.

19. The method of claim 18, wherein the cleanup engine is warmed by passing exhaust from the generator flare through the cylinders of the cleanup engine.

20. The method of claim 18, wherein heat from the generator flare is used to heat coolant for the cleanup engine.

21. The method of claim 18, wherein the cleanup engine is operated at lean conditions at startup and heat from the generator flare is used to warm air entering the cleanup engine.

22. The method of claim 21, wherein a spark plug is used during warmup and ignition timing is between 50° and 0° before top dead center.

23. The method of claim 18, wherein solar energy is used to heat coolant for the cleanup engine.

24. The method of claim 17, wherein starting the cleanup engine comprises:
monitoring a temperature of the syngas generator and a temperature of the producer gas in the generator flare;
comparing the monitored temperature to a predetermined value;
and when the monitored temperature reaches the predetermined value, closing the syngas flare actuator and opening the cleanup air actuator.

25. The method of claim 24, wherein starting the cleanup engine further comprises opening the cleanup flare actuator and closing the power engine fuel actuator when the monitored temperature reaches the predetermined value.

26. The method of claim 17, wherein starting the power producing engine comprises:
monitoring a temperature of the cleaned syngas in the cleanup flare;
comparing the monitored temperature to a predetermined value;
and when the monitored temperature reaches the predetermined value, closing the cleanup flare actuator and opening the power engine fuel actuator.

27. The method of claim 26, wherein starting the power producing engine further comprises:
monitoring a temperature of a coolant in the cleanup engine;
comparing the monitored coolant temperature to a predetermined value; and
when the monitored coolant temperature reaches the predetermined value, closing the cleanup flare actuator and opening the power engine fuel actuator.

28. A method of shutting down the integrated biomass conversion system of claim 1, comprising:
stopping the power producing engine and the cleanup engine while the syngas generator is operational; and
stopping the syngas generator after the power producing engine and the cleanup engine have stopped.

29. The method of claim 28, wherein a rotational speed of the power producing engine and the cleanup engine are monitored to determine that the power producing engine and the cleanup engine have stopped.

30. The method of claim 28, wherein stopping the power producing engine and the cleanup engine comprises:
closing the cleanup air actuator and closing the power engine fuel actuator.

31. The method of claim 28, wherein stopping the syngas generator comprises:
opening the syngas flare actuator; and
stopping a flow of solid fuel to the syngas generator.

32. The method of claim 28, further comprising:
injecting a solvent into the cleanup engine after the syngas generator has stopped generating producer gas.

33. The method of claim 32, wherein a temperature in the generator flare is monitored to determine when the syngas generator has stopped generating producer gas.

34. An integrated biomass conversion system for producing chemicals from solid fuels, comprising:
a syngas generator to form producer gas from solid fuels;
a cleanup engine in communication with an outlet of the syngas generator to remove tar from the producer gas and create cleaned syngas;
a chemical reactor in communication with an outlet of the cleanup engine;
a generator flare;
a syngas flare actuator, in communication with the outlet of the syngas generator and the generator flare;
a cleanup flare;
a cleanup flare actuator, in communication with the outlet of the cleanup engine and the cleanup flare;
a chemical reactor actuator disposed between the outlet from the cleanup engine and an inlet of a chemical system.

35. A method of starting up the integrated biomass conversion system of claim 34, comprising:
starting up the syngas generator, while the cleanup engine and the chemical reactor are turned off;
starting the cleanup engine after the syngas generator is fully operational; and
starting the chemical reactor after the cleanup engine is fully operational.

36. The method of claim 35, wherein a flow of cleaned syngas from the cleanup engine is ramped up as the chemical reactor is started.

* * * * *